No. 693,816.  
H. HAHN.  
CASH REGISTER.  
(Application filed Mar. 15, 1900.)  
Patented Feb. 18, 1902.

(No Model.)  
5 Sheets—Sheet 1.

Witnesses:  
E. A. Brandau  
G. W. Marsh

Inventor:  
Herman Hahn  
by A. F. Murdock & Co.  
Attys.

No. 693,816. Patented Feb. 18, 1902.
H. HAHN.
CASH REGISTER.
(Application filed Mar. 15, 1900.)

(No Model.) 5 Sheets—Sheet 2.

Witnesses: Inventor:

No. 693,816. Patented Feb. 18, 1902.
H. HAHN.
CASH REGISTER.
(Application filed Mar. 15, 1900.)

(No Model.) 5 Sheets—Sheet 3.

Witnesses
E. A. Brandau
G. H. Marsh

Inventor:
Herman Hahn
by E. F. Murdock & Co.
attys.

No. 693,816. Patented Feb. 18, 1902.
H. HAHN.
CASH REGISTER.
(Application filed Mar. 15, 1900.)
(No Model.) 5 Sheets—Sheet 4.
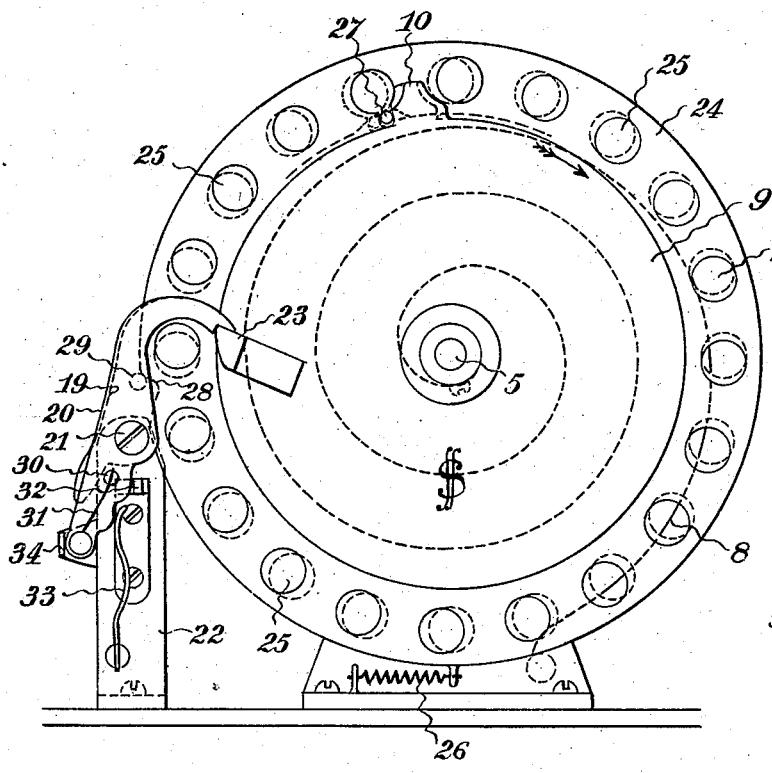
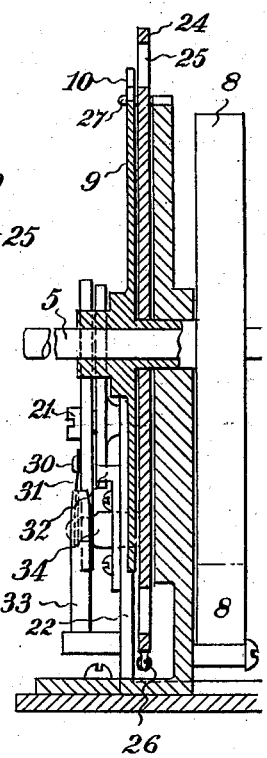
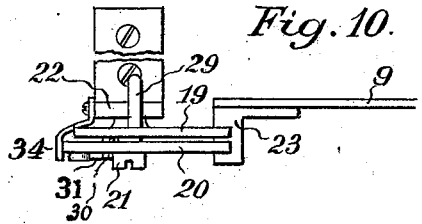
Witnesses:
E. A. Brandau
G. W. Marsh
Inventor:
Herman Hahn
by E. F. Murdock & Co.
attys.

No. 693,816. Patented Feb. 18, 1902.
H. HAHN.
CASH REGISTER.
(Application filed Mar. 15, 1900.)
(No Model.) 5 Sheets—Sheet 5.
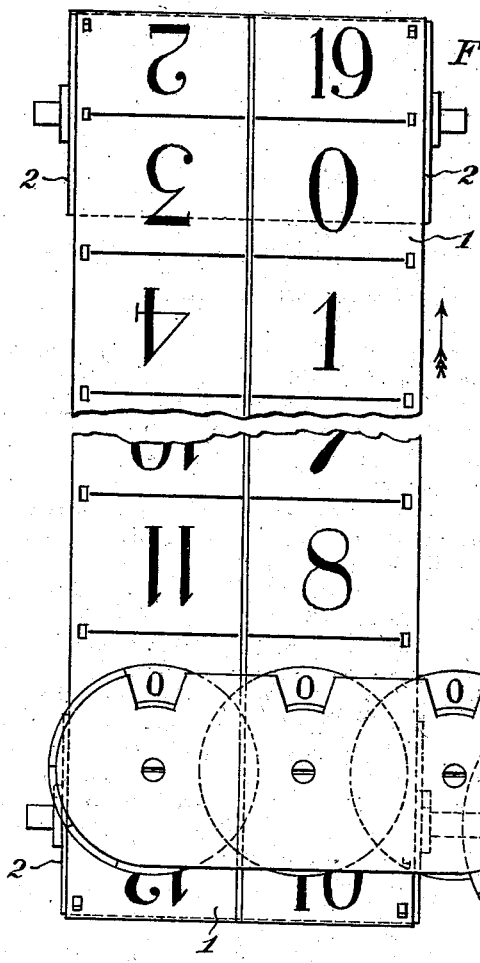
Fig. 11.
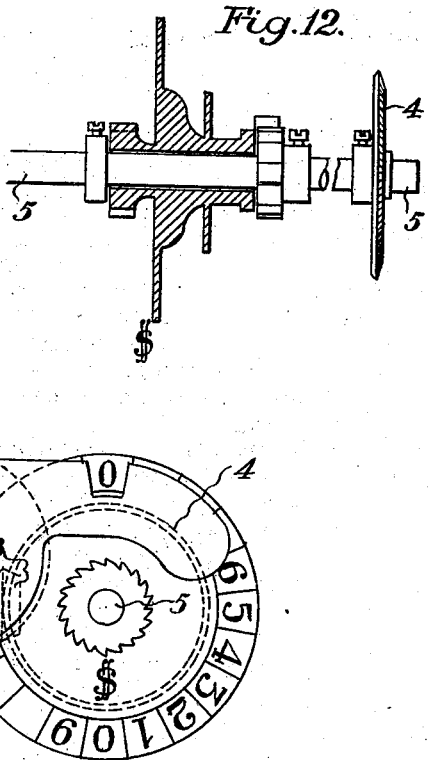
Fig. 12.
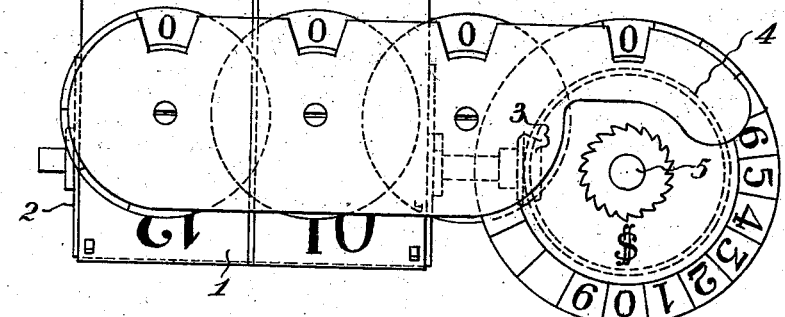
Fig. 13. Fig. 14. Fig. 15.
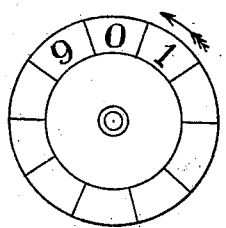
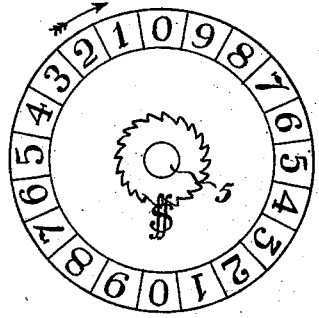
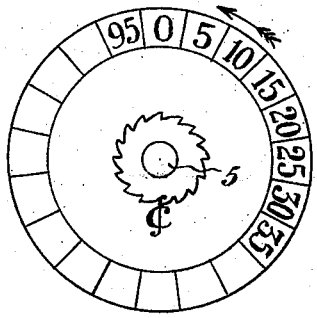
Witnesses:
E. A. Brandau
G. W. Marsh
Inventor:
Herman Hahn
by E. F. Murdock & Co.
attys.
THE NORRIS PETERS CO., PHOTO-LITHO., WASHINGTON, D. C.

UNITED STATES PATENT OFFICE.

HERMAN HAHN, OF SAN FRANCISCO, CALIFORNIA, ASSIGNOR TO THE ACME CASH REGISTER COMPANY, OF SAN FRANCISCO, CALIFORNIA, A CORPORATION OF CALIFORNIA.

CASH-REGISTER.

SPECIFICATION forming part of Letters Patent No. 693,816, dated February 18, 1902.

Application filed March 15, 1900. Serial No. 8,696. (No model.)

*To all whom it may concern:*

Be it known that I, HERMAN HAHN, a citizen of the United States, residing at 126 Thurlow Block, San Francisco, in the county of San Francisco and State of California, have invented certain new and useful Improvements in Cash Registers and Indicators; and I do hereby declare the following to be a full, clear, and exact description of said invention, such as will enable others skilled in the art to which it most nearly appertains to make, use, and practice the same.

This invention relates to improvements in cash registers and indicators.

Figure 1:
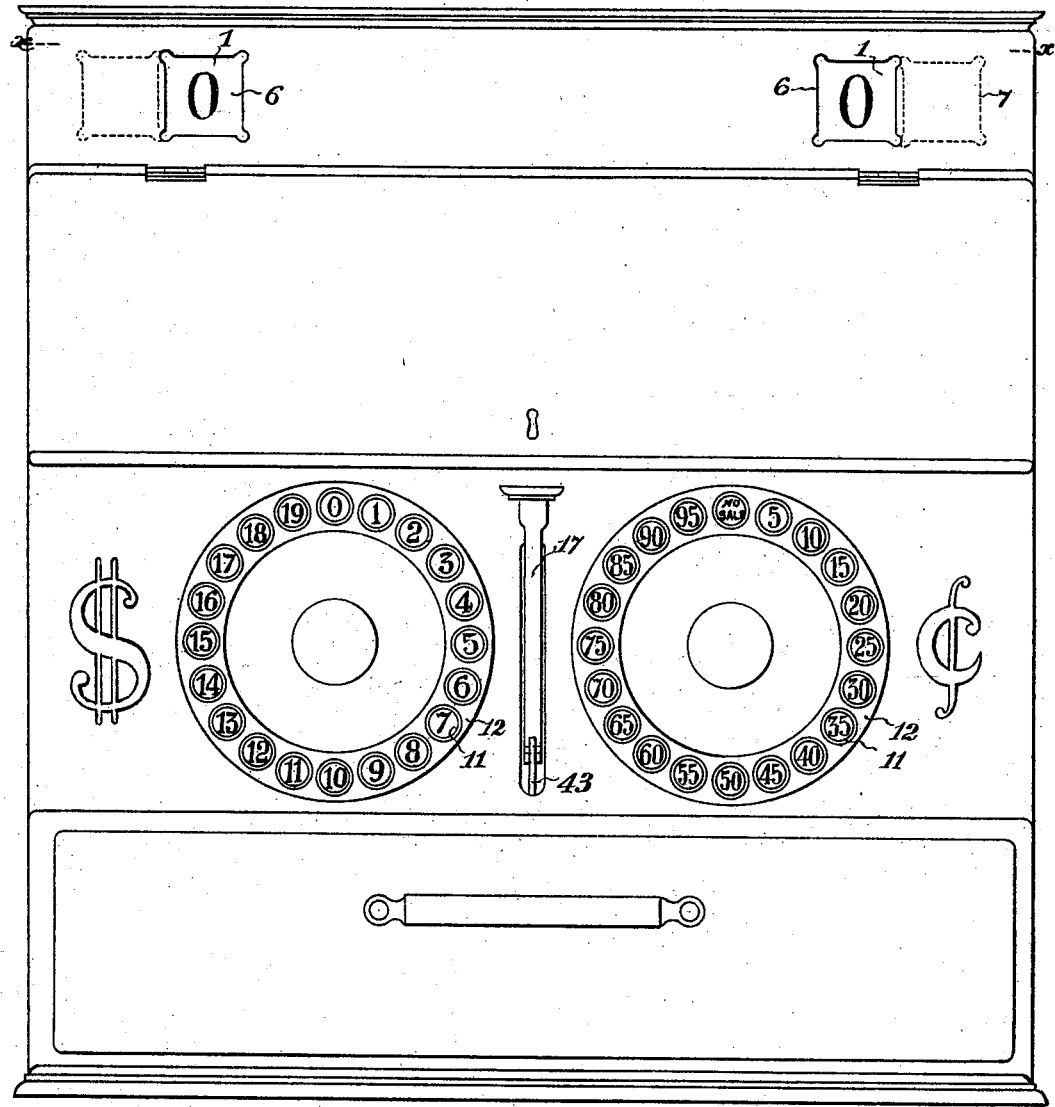
Figure 2:
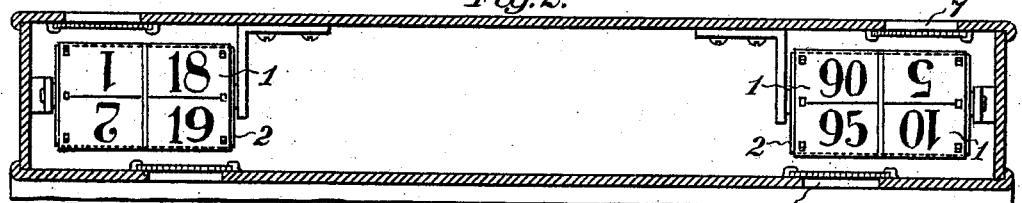
Figure 3:
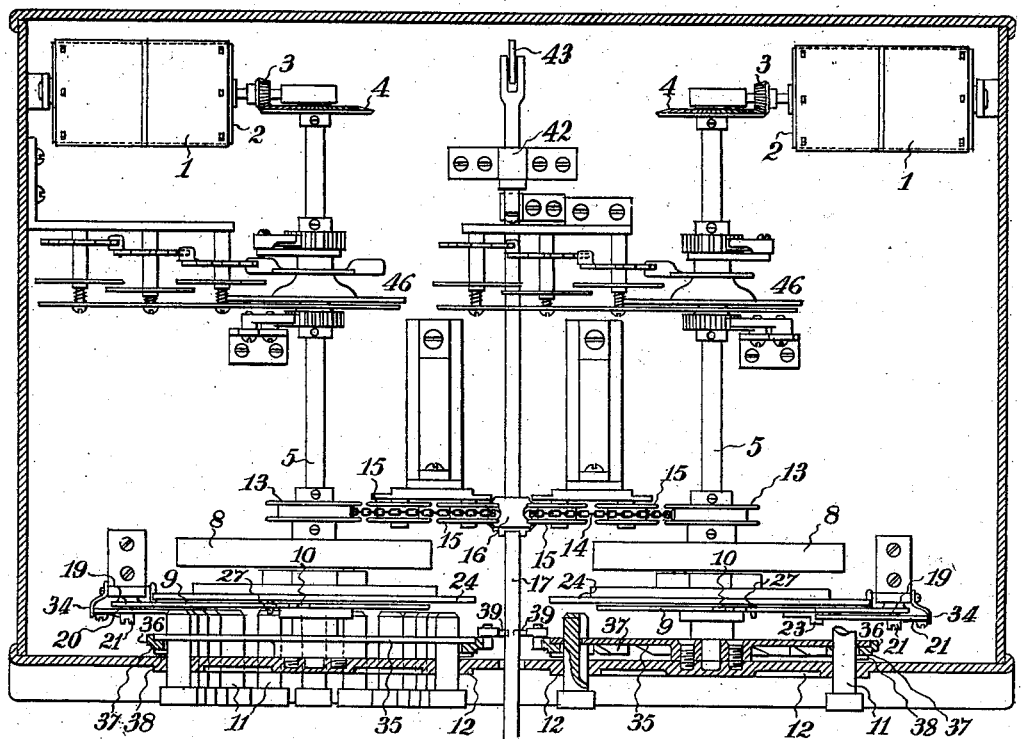
Figure 4:
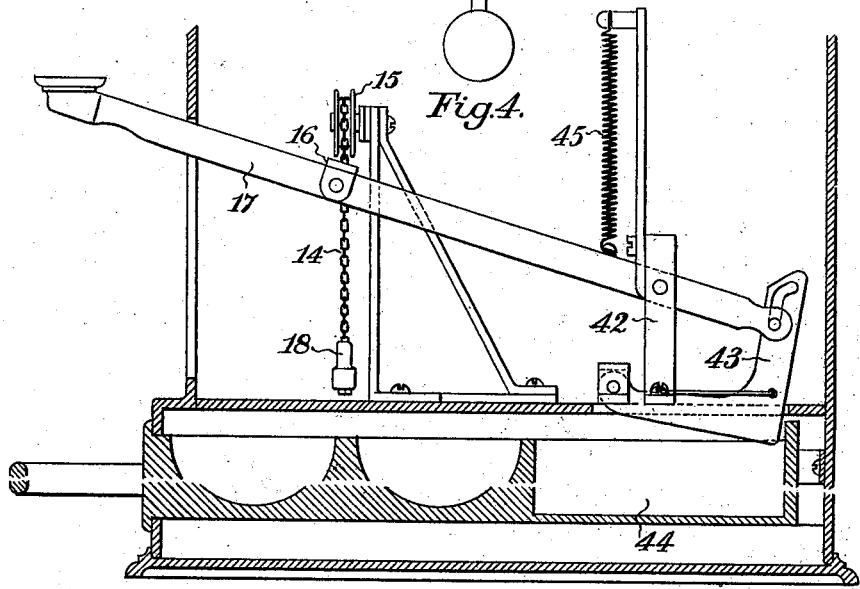
Figure 5:
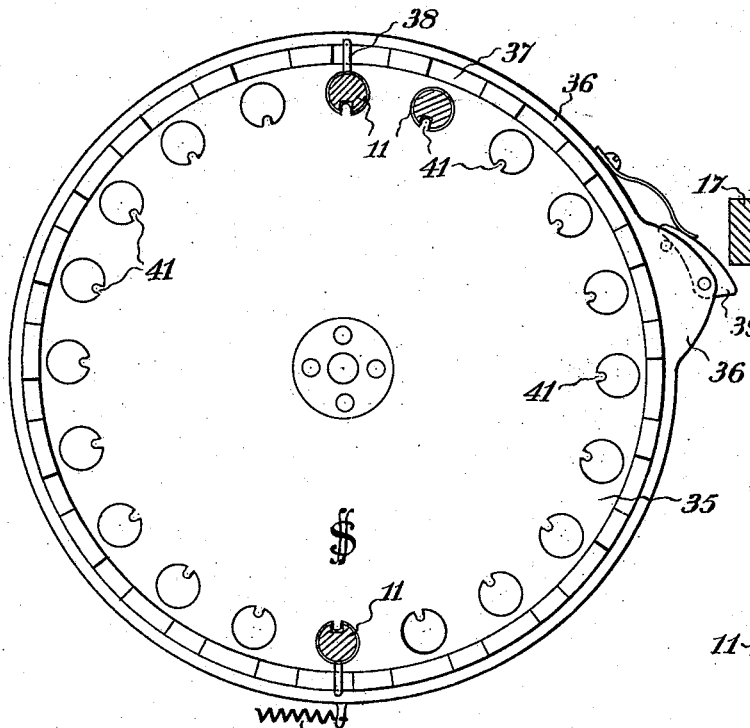
Figure 6:
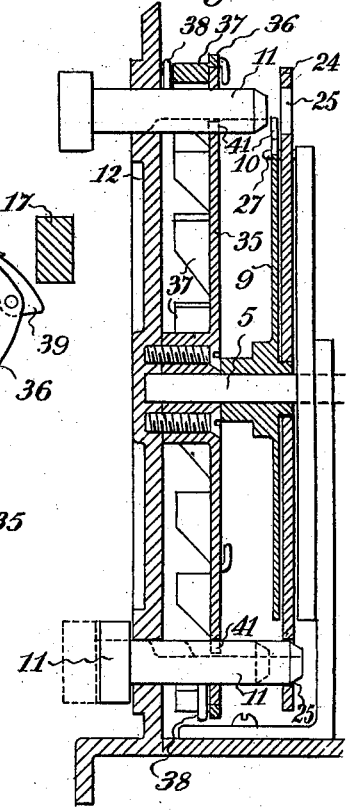
Figure 7:
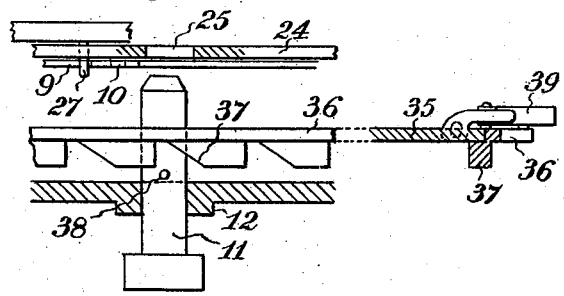

In the drawings, Figure 1 is a front elevation of a device constructed in accordance with this invention. Fig. 2 is a plan view in section of the upper portion of the case, showing the indicating-ribbons by which the various selected numbers are displayed. Fig. 3 is a plan view of the entire operative mechanism, the containing-case and a selection-dial being shown in section. Fig. 4 is a detail view, in side elevation, of the money-drawer-releasing mechanism, the drawer being shown in section and broken and compressed in space. Fig. 5 is a detail view, in front elevation, of the selection-dial, readjusting-ring, and, in section, the money-drawer-releasing lever in its relative position. Fig. 6 is a vertical central section of the said dial and ring and of the disks and the mountings of the same. Fig. 7 is a detail view in plan and partly in section, showing the construction and arrangement of the selection-dial, the keys, the disks, and the readjusting-ring. Fig. 8 is a detail view of the disks and the double dogs for holding the disks and in dotted lines the position of the perforations in the releasing-disk when the same is turned backward in operation. Fig. 9 is a vertical central section of the parts shown in Fig. 8. Fig. 10 is a detail in plan of a portion of the operating-disk and double retaining-dogs. Fig. 11 is a front elevation of the indicating-ribbon and a constant-registering mechanism. Fig. 12 is a detail view of the main shaft, showing the beveled gear for operating the ribbon and in section the "units-disk" and ratchet-retaining wheel of the register. Figs. 13 and 14 are front elevations of the register-disks of the "tens" and "units," respectively, of the register on the "dollar" side of the machine. Fig. 15 is a similar view of the register-disk of the units on the "cents" side of the machine.

The objects which the present invention has in view are to produce a mechanism of the nature indicated which is simple and accurate and rapid in operation and to reset all of the indicating parts in their initial positions between successive operations.

With these objects in view the invention consists in providing two duplicate indicating and registering mechanisms in the same case, similar in all essential features, the one to indicate and register the cents and the other the dollars of the purchase price and in operating each of these indicators and registers by spring-actuated mechanisms released by and controlled by keys bearing numbers on their faces in the serial order of their arrangement and by subsequently resetting the keys and the indicating mechanisms to their original positions by the mechanism by which the money-drawer is operated. The two mechanisms being thus similar, I will in the description describe only one, the same distinguishing numbers being shown in the drawings as assigned to each set of parts.

The "indicator" to which the "purchaser's" attention is called is formed by a double ribbon 1, which is mounted on the drums or spools 2 2, the lower of which is fixed on a shaft, on the inner end of which is mounted the beveled gear 3. This beveled gear 3 and the shaft and spool to which it is attached are rotated by a large gear 4, mounted on the end of a main shaft 5. The gears 3 and 4 are so calculated as to rotate the smaller gear a sufficient number of times to cause the ribbon 1 to travel its entire length driving one complete revolution of the gear 4 and the shaft 5. The ribbon is provided with two sets of figures, arranged reversely, as shown at Fig. 11 of the drawings. The reason for this arrangement is that the figures on the one side are read in ascending on one side of the spool 2 at the opening 6 in the front of the case, while the figures on the other side are read in descending on the other side of the said spool at the opening 7 in the back of the case.

The shaft 5 is rotated in a forward direction by the coil-spring 8 and carries near the forward end the operating-disk 9, by which its forward movement is controlled or arrested by the lug 10 on the edge thereof coming in contact with one of the push-pins 11, said push-pins forming keys and arresting devices which have been forced forward in the path of the said lug, (see Fig. 6 of the drawings,) said lug thus becoming a projection fixed to the shaft to move positively therewith and extending radially therefrom. These keys 11 are set about the dial 12 in equal divisions, which correspond with the divisions on the ribbon 1. By thus controlling the rotation of the disk 9, shaft 5, and gear 4 they also control the travel of the ribbon 1. By assigning numbers to the successive keys corresponding to the successive numbers on the ribbon the number on the ribbon exposed before the openings 6 and 7 will correspond to the number of the key which has been pushed into the path of the lug 10 to arrest it.

Between each operation it is needful that the shaft 5 and its connected parts, including the disk 9 and ribbon 1, be returned to the initial or zero point, and it is also needful that they be held in such initial position, and that the key or pin 11 which was forward be returned back out of the path of the lug 10. It is for this purpose that the drum 13 is mounted on the shaft 5 to wind the chain 14 on itself as the shaft is rotated. One end of said chain is connected to the drum, while its other end passes over the idlers 15 15 and hangs downward through the loop 16 on the lever 17 and is provided with the block 18 at or near the free end of the chain and at the lowest extremity of the throw of the lever or loop 16 when the same is depressed and when the disk 9 is in its normal or locked position. When the disk 9 is advanced, however slightly, the chain is wound on the drum and the block 18 is raised in the path of the loop 16, which in descending carries it downward and unwinds the chain 14 and rotates the drum 13 and shaft 5 backward to reset and lock the disk 9.

The disk 9 is locked by the double dogs 19 and 20, which are mounted on the pivot 21, set out from the bracket 22. Each dog falls over an L-shaped lug 23, set out from the face of the disk 9 (see Fig. 8 of the drawings) when the said disk is in its normal or set position and when the ribbons are indicating "0" or "No sale." The dogs are thus doubled that one may be constantly held by the releasing member, which throws them out of engagement with the lug 23, while the other is immediately released and falls in position to engage the said lug as the same is returned or reset prior to the releasing member being moved to permit the other dog to engage the lug.

The releasing member is the disk 24, the outer edge of which is provided with the same number of perforations 25 as there are pins or keys 11 and into which the ends of the pins are adapted to enter when pushed inward to the limit of their movement. This disk is loosely mounted on the shaft 5 and has an oscillatory movement of about one-sixteenth of an inch, being held in its forward position by the weak spring 26 forcing the pin 27 against the rear side of the lug 10 on the disk 9, which is held by the dogs 19 and 20.

The dogs 19 and 20 are thrown out of engagement with the lug 23 by throwing the disk 24 backward, causing the cam-shoulder 28 to ride under the pin 29, set out from the side of the dog 19, clear of the lug 23 when the pin is at the top of the cam. In this movement outward from the lug 23 the two dogs act simultaneously, being controlled by the small pin 30, which is extended through the lower extension of the dog 20 into the path of the lower extension of the dog 19. When, then, the dog 19 is moved outward by the cam 28, the lower extension impinges on the pin 30 and moves simultaneously the dog 20 until both dogs are clear of the lug 23 and the disk 9 is permitted to rotate forward. The pin 30 is held in its position extended through the dog 20 by the spring 31. Mounted on the side of the bracket 22 is a stationary cam 32 in the path of the pin 30, which raises outward the pin as the same is carried toward and over it by the movement of the dogs. The end of the pin 30 is rounded, and when it is raised sufficiently it rides on an abutting surface of the dog 19 by reason of the pressure of the spring 33 on the dog 20, which causes the dog to immediately fly forward into the path of the lug 23, ready to engage the same as it is returned. The stop 34 maintains the dog 20 in the proper position in the absence of the lug 23. The dog 19 remains in its outward position, however, until the disk 24 is moved forward to carry the cam 28 forward and allow the pin 29 to fall in position and the dog 19 to engage the lug 23. During this separation of the dogs the pin 30 has rested against the dog 19 and does not extend forward until the same is in engagement with the lug 23.

The disk 24 is thrown back, as described, by the key-pins 11 entering the perforations 25. For this purpose the perforations 25 are placed out of alinement with the perforations in the dial 12 and disk 35, in which the key-pins 11 are mounted. (See Fig. 7 of the drawings.) This disadjustment is the distance required to move the releasing-disk 24 to place the cam 28 full under the pin 29 to throw the dogs 19 and 20 from the lug 23. The ends of the key-pins are coned, as shown, to enter the perforations and to force the perforations 25 into true alinement by entering them and forcing the disk 24 backward to allow it. As stated, this action of the disk 24 releases the disk 9 from the engagement of the dogs 19 and 20 and permits the same to be rotated forward by the spring 8 until the lug 10 strikes upon and is arrested by the key 11, which has been pushed inward to release the disk. It is now necessary that the key-pin 11 remain in this position until the disk 9 is reset; otherwise the said disk would continue to rotate. The key 11 is thus held by the friction of the disk 24 and the spring 26, pulling on the same. By the use and construction of the dogs 19 and 20 the disk 9 may be returned and locked in position by the dog 20 before the key 11 is withdrawn and the disk 24 moved to allow the dog 19 to engage the disk. The disk 9 is reset by the depression of the lever 17, as above described. The key-pins 11 are extracted from the perforations 25 by the same lever moving the releasing-ring 36 and inserting the cam-shaped extensions 37 under the pins 38, with which the key-pins are provided. (See Figs. 5, 6, and 7 of the drawings.) This forces the key-pins 11 outward out of engagement with the perforations 25. As stated, this is accomplished after the disk 9 has been reset and locked. This action of the ring 36 is caused by the upward movement of the lever 17. In the downward movement of the lever it comes in contact with the free end of the pawl 39 and moves the same out of its path. In its return movement, however, it catches under the pawl in its fixed position and by it throws the ring around on its bearing on the disk 35 to free the keys 11, as described. When the lever 17 has passed upward out of engagement with the pawl 39, the ring is returned to its normal position by the spring 40, and the path of the pins 38 in the key-pins is again free.

The keys 11 are provided with enlarged heads, on which are imprinted the usual numbers *seriatim*, as shown at Fig. 1 of the drawings. The keys are held in upright or correct position by the small tongues 41, extended into the circle of the perforations of the disk 35. (See Fig. 5 of the drawings.) To receive these small tongues the key-pins are channeled part of their length.

The money-drawer of this machine is released by the lever 17, which is fulcrumed on a standard 42 and engages a latch 43, which is raised out of engagement with the drawer 44 when the forward end of the lever 17 is depressed, by which action the registers are reset to "0." It therefore becomes necessary in operating this machine to make the indication and register only after the drawer is opened to receive the cash indicated and registered. The lever 17 is raised to its normal position by the spring 45.

In the operation of a machine constructed in accordance with this description and drawings accompanying the actions are as follows: The first step is to open the drawer 44, which is done by depressing the forward end of the lever 17. The purchase-price is then pointed out on the keys 11, using both sets of dials to indicate the "dollars" and the "cents" of the purchase price. By pressing the correct keys the indication is made by the ribbon 1 traveling and coming to rest to expose the numbers on its surface before the openings 6 and 7 corresponding with the numbers on the keys pressed inward. The drawer is closed after depositing the money or making change. The indicator continues to be exposed until the next operation. If the operation is to make change, this may be done by depressing the lever 17 to open the drawer and by not using the keys, whereby the indication of the former sale will be destroyed and no new indication will be made. As each indication is made a constant register 46, on and operated by each shaft 5, adds to the total amount of sales. The register used by me is shown and described in a patent issued to Joseph W. Whitney the 13th day of June, 1899, and numbered 627,032, to which reference is here made for a full explanation of its construction and operation.

Having thus described my invention, what I claim as new, and desire to secure by Letters Patent, is—

1. In a device of the nature indicated, the combination with a shaft adapted to be rotated, and a projection connected thereto and extending radially therefrom, of a suitable mechanism to rotate the shaft in one direction, a dog to engage a part connected to said shaft and hold the shaft in its normal position, a series of pins forming keys circularly arranged in the front wall of the casing and adapted to extend into the path of the said projection, said pins having an inclined surface on their inner ends, a releasing member to disengage the dog from said part connected to said shaft and consisting in a disk-like member having a series of openings corresponding in number to the said pins, and the one wall of the said openings being in the path of and slightly out of line with the said pins to be moved into line by the same when moved into the path of the said projection, and thereby cause the said releasing member to move the said dog, an indicating device bearing characters indicative of amounts and connected to move with the said shaft, and a resetting mechanism to rotate the shaft to its normal position; substantially as described.

2. In a device of the nature indicated, the combination with a shaft adapted to be rotated, and a projection connected thereto and extending radially therefrom, of a suitable mechanism to rotate the shaft in one direction, a dog to engage a part connected to said shaft and thereby lock the same, a series of pins forming keys circularly arranged in the front wall of the casing and adapted to extend into the path of the said projection, said pins having an inclined surface on their inner ends, a disk loosely mounted on the shaft and having a series of perforations corresponding in number to the said pins and slightly out of line therewith to be entered by the pins moving the said disk and the perforations into line, means whereby said disk in its movement disconnects said dog from said part carried by said shaft and said dog is then permitted to fall into position to again lock said shaft, an indicating device bearing characters indicative of amounts and connected to move with the said shaft, and a resetting mechanism to rotate the shaft to its normal position; substantially as described.

3. In a device of the nature indicated, the combination with a shaft adapted to be rotated, and a projection connected thereto and extending radially therefrom, of a suitable mechanism to rotate the shaft in one direction, a part carried by said shaft to move therewith, a dog to engage the said part, a series of pins forming keys circularly arranged in the front wall of the casing and adapted to extend into the path of the said projection, said pins having an inclined surface on their inner ends, a disk loosely mounted on the shaft and having a series of perforations corresponding in number to the said pins and slightly out of line therewith to be entered by the pins moving the said disk and the perforations into line, said disk being provided with a cam-shoulder, an arm pivotally mounted and extended beside the said dog and set in the path of the said cam-shoulder on the disk to be moved thereby, a spring-actuated pin extending from the said dog in the path of the said arm, and means for withdrawing the said pin when the dog has been moved to disengage the said part on the shaft, an indicating device bearing characters indicative of amounts and connected to move with the said shaft, and a resetting mechanism to rotate the shaft to its normal position; substantially as described.

4. In a device of the nature indicated, the combination with a shaft adapted to be rotated, and a projection connected thereto and extending radially therefrom, of a suitable mechanism to rotate the shaft in one direction, a series of pins forming keys circularly arranged in the front wall of the casing and adapted to extend into the path of the said projection, said pins having an inclined surface on their inner ends, a disk loosely mounted on the shaft and having a series of perforations corresponding in number to the said pins and slightly out of line therewith to be entered by the pins moving the said disk and the perforations into line, a projection set out from each of the said pins, a series of connected cams loosely mounted in front of the said projections and adapted to pass under the same to throw the pins outwardly, an operating mechanism to partially rotate the said cams to pass under the said projections, an indicating device bearing characters indicative of amounts and connected to move with the said shaft, and a resetting mechanism to rotate the shaft to its normal position; substantially as described.

In testimony whereof I have hereunto set my hand this 27th day of October, 1899.

HERMAN HAHN.

Witnesses:
E. F. MURDOCK,
G. W. MARSH.